United States Patent
Sharp

(10) Patent No.: US 11,343,218 B2
(45) Date of Patent: May 24, 2022

(54) SYSTEMS AND METHODS FOR ENABLING USERS OF A SOCIAL NETWORKING SYSTEM TO ASSIST EACH OTHER IN MAKING CONNECTIONS WITH OTHER USERS

(71) Applicant: Meta Platforms, Inc., Menlo Park, CA (US)

(72) Inventor: Nathan Sharp, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 184 days.

(21) Appl. No.: 15/922,843

(22) Filed: Mar. 15, 2018

(65) Prior Publication Data
US 2019/0288976 A1    Sep. 19, 2019

(51) Int. Cl.
| | | |
|---|---|---|
| *H04L 12/58* | (2006.01) | |
| *G06Q 50/00* | (2012.01) | |
| *G06F 16/9535* | (2019.01) | |
| *H04L 51/52* | (2022.01) | |
| *H04L 51/02* | (2022.01) | |

(52) U.S. Cl.
CPC .......... *H04L 51/32* (2013.01); *G06F 16/9535* (2019.01); *G06Q 50/01* (2013.01); *H04L 51/02* (2013.01)

(58) Field of Classification Search
CPC ...... H04L 51/32; G06F 16/9535; G06Q 50/01
USPC ....................................................... 705/319
See application file for complete search history.

(56) References Cited

U.S. PATENT DOCUMENTS

| | | | | |
|---|---|---|---|---|
| 7,085,806 B1 * | 8/2006 | Shapira | ................. | G06Q 30/08 705/1.1 |
| 8,909,725 B1 * | 12/2014 | Sehn | ................... | H04L 67/2842 709/206 |
| 10,320,734 B1 * | 6/2019 | Mishra | ................... | G06Q 50/01 |

(Continued)

FOREIGN PATENT DOCUMENTS

| | | | | |
|---|---|---|---|---|
| WO | WO-2017136363 A1 * | 8/2017 | ......... | G06Q 30/0241 |
| WO | 2019/178298 A1 | 9/2019 | | |

OTHER PUBLICATIONS wingmanapp.com, Sep. 28, 2017, retrieved from https://web.archive.org/web/20170928214541/http://wingmanapp.com, pp. 2-3 (Year: 2017).*

(Continued)

Primary Examiner — Sangeeta Bahl
Assistant Examiner — Joshua D Schneider
(74) Attorney, Agent, or Firm — FisherBroyles, LLP

(57) ABSTRACT

A disclosed computer-implemented method may include (1) receiving, from a participant of a discovery service of a social networking system, a request for a friend of the participant to assist the participant in making connections with other participants of the discovery service, (2) identifying at least one set of information that is associated with the discovery service and that is designated as private to the participant, and (3) providing the friend of the participant with access to at least a portion of the set of information via a recommendation interface that enables the friend of the participant to make recommendations to the participant regarding the set of information to assist the participant in (Continued)

making connections with other participants of the discovery service. Various other methods, systems, and computer-readable media are also disclosed.

20 Claims, 8 Drawing Sheets

(56) References Cited

U.S. PATENT DOCUMENTS

| | | | |
|---|---|---|---|
| 2002/0194049 A1* | 12/2002 | Boyd | G06Q 10/109 |
| | | | 709/204 |
| 2010/0293476 A1* | 11/2010 | Rosenblum | H04L 12/6418 |
| | | | 715/753 |
| 2011/0153669 A1 | 6/2011 | Villa et al. | |
| 2012/0290978 A1 | 11/2012 | Devecka | |
| 2014/0043426 A1* | 2/2014 | Bicanic | H04N 21/41407 |
| | | | 348/14.02 |
| 2014/0279066 A1 | 9/2014 | Louis et al. | |
| 2014/0280140 A1* | 9/2014 | Ling | H04N 21/26283 |
| | | | 707/737 |
| 2014/0282096 A1* | 9/2014 | Rubinstein | G06F 3/04842 |
| | | | 715/753 |
| 2017/0039204 A1* | 2/2017 | Blanchflower | G06F 16/215 |

OTHER PUBLICATIONS

Carimé Lane, This Woman Found the Job of Her Dreams While Looking for Love, Jan. 9, 2017, the Penny Hoarder, retrieved from https://www.thepennyhoarder.com/make-money/dating-profile-writer/ (Year: 2017).*

Theresa Di Donato, "Do Your Friends Help (or Hurt) Your Chances to Find Love?", Feb. 21, 2014, https://www.psychologytoday.com/ (Year: 2014).*

Joshua Ackerman et al., "Cooperative Courtship: Helping Friends Raise and Raze Relationship Barriers", 2009, Personality and Social Psychology Bulletin 35.10, 1285-1300. (Year: 2009).*

International Search Report and Written Opinion received for PCT Application Serial No. PCT/US2019/022152 dated May 21, 2019, 9 pages.

International Preliminary Report on Patentability received for PCT Application Serial No. PCT/US2019/022152 dated Sep. 24, 2020, 8 pages.

* cited by examiner

SYSTEMS AND METHODS FOR ENABLING USERS OF A SOCIAL NETWORKING SYSTEM TO ASSIST EACH OTHER IN MAKING CONNECTIONS WITH OTHER USERS

BACKGROUND

Modern social networking systems have revolutionized how people connect to and communicate with each other. For example, users of social networking systems may share information (e.g., posts, news stories, media, etc.) with other users, join groups that include other users who share common interests, and so forth. Unfortunately, it may be difficult for users of a social networking system to initiate new relationships with other users of the social networking system.

For example, a user may wish to find a new romantic partner, and therefore may wish to identify other users of the social networking system with whom he or she may be compatible (e.g., socially compatible, romantically compatible, sexually compatible, etc.). However, much of the information necessary to identify such compatibility, such as mutual interests, physical characteristics, sexual orientation, sexual identity, religious views, and so forth may be designated as private within the social networking system, and may therefore be hidden from the user.

Specialized discovery services such as dating services may provide mechanisms for participants of the services to share some private information (e.g., specialized dating profiles, potential dating connections, etc.) with other participants. However, such specialized discovery services may provide few options for others (e.g., participants and non-participants of the dating service) to actively assist the participants in making connections. For example, a participant of a dating service may desire assistance from a friend of the participant in a social networking system (e.g., a friend, a family member, etc.) in making dating connections with other participants of the dating service. However, traditional dating services may not provide useful systems or methods for sharing the participant's private dating information with users of a social networking system, or for enabling users of the social networking system to provide recommendations to the participant regarding the participant's private dating information.

Hence, the instant application identifies and addresses a need for new systems and methods that enable users of a social networking system to assist each other in making connections within the social networking system.

SUMMARY

As will be described in greater detail below, the instant disclosure describes various systems and methods that may enable users of a social networking system to assist each other in making connections within the social networking system. The systems and methods described herein may provide a friend of a participant of a discovery service of the social media network with access to private information of the participant via a recommendation interface. The recommendation interface may enable the friend to make recommendations to the friend regarding the participant's private information. For example, in embodiments where the discovery service may include a dating service, the friend may provide recommendations to the friend regarding a dating profile of the participant, or the friend may evaluate and recommend other participants of a dating service to the participant. Additional examples and illustrations will be provided in the description below.

In some examples, a computer-implemented method for enabling users of a social networking system to assist each other in making dating connections within the social networking system may include receiving, from a participant of a discovery service of a social networking system, a request for a friend of the participant to assist the participant in making connections with other participants of the discovery service. The method may further include identifying at least one set of information that is associated with the discovery service and that is designated as private to the participant. The method may also include providing the friend of the participant with access to at least a portion of the set of information via a recommendation interface that enables the friend of the participant to make recommendations to the participant regarding the set of information to assist the participant in making connections with other participants of the discovery service. In at least some examples, the method may further include receiving a recommendation regarding the set of information from the friend via the recommendation interface.

In some embodiments, the discovery service of the social networking system may include a dating service of the social networking system. In some examples, the set of information may include at least one of (1) a dating profile of the participant, (2) a representation of at least one additional participant in the dating service of the social networking system, or (3) an interface of the social networking system that visually indicates, when representing an additional user of the social networking system within the social networking system, whether the additional user is also participating in the dating service of the social networking system.

In at least one example, the set of information may include a dating profile of the participant, and the recommendation interface may include at least one interface element that enables the friend of the participant to recommend at least one change to the dating profile to the participant. In such examples, the interface element may include an editing interface that enables the friend to edit the dating profile of the participant.

In at least one embodiment, the set of information may include a representation of at least one additional participant in the dating service of the social networking system. In such embodiments, providing the friend with access to at least a portion of the set of information via the recommendation interface may include presenting the representation of the additional participant to the friend via the recommendation interface, and the recommendation interface may include an interface element that enables the friend to recommend the additional participant to the participant as a potential connection.

In at least one example, the set of information may include an interface of the social networking system that visually indicates, when representing an additional user of the social networking system within the social networking system, whether the additional user is also participating in the dating service of the social networking system. In such examples, the recommendation interface may include an interface element that enables the friend to recommend the additional user to the participant as a potential connection when the interface of the social networking system visually indicates that the additional user is also participating in the dating service of the social networking system.

In some embodiments, the computer-implemented method may further include (1) presenting the request for the friend of the participant to assist the participant in making connections with other participants of the discovery service to the friend of the participant, and (2) acquiring, from the friend of the participant, an approval of the request. In such embodiments, providing the friend with access to the portion of the set of information via the recommendation interface may include providing the friend with access to the portion of the set of information via the recommendation interface in response to acquiring the approval of the request.

In at least some embodiments, identifying the set of information may include excluding, from the set of information, information regarding users of the social networking system who are at least one of (1) friends of the participant, or (2) friends of the friend. In at least some examples, the computer-implemented method may include preventing the friend from viewing the set of information via the recommendation interface after an expiration of a predefined period of time. In some examples, the computer-implemented method may further include preventing the friend from making more than a predetermined amount of recommendations during a predefined period of time.

In some embodiments, the friend may be a relative of the participant. In further embodiments, the computer-implemented method may further include recommending a user of the social networking system as a potential source of recommendations. In some examples, recommending the user of the social networking system may be based on at least one of (1) previous experience of the user in making recommendations to assist participants of the discovery service in making connections with other participants of the discovery service, or (2) a relationship of the user to the participant.

In at least one embodiment, the computer-implemented method may further include (1) receiving, from the participant in the discovery service of the social networking system, an additional request for at least one additional friend of the participant to assist the participant in making connections with other participants of the discovery service, and (2) while providing the friend of the participant with access to the set of information via the recommendation interface, providing the additional friend of the participant with access to the set of information via an additional recommendation interface that enables the additional friend of the participant to make recommendations to the participant regarding the set of information.

In addition, a corresponding system for enabling users of a social networking system to assist each other in making connections within the social networking system may include several modules stored in memory. In some examples, the system may include a receiving module that receives, from a participant of a discovery service of a social networking system, a request for a friend of the participant to assist the participant in making connections with other participants of the discovery service. In some examples, the system may further include an identifying module that identifies at least one set of information that is associated with the discovery service and that is designated as private to the participant. In further examples, the system may also include a providing module that provides the friend of the participant with access to at least a portion of the set of information via a recommendation interface that enables the friend of the participant to make recommendations to the participant regarding the set of information to assist the participant in making connections with other participants of the discovery service. In some examples, the system may further include at least one physical processor that executes the receiving module, the identifying module, and the providing module. In at least one embodiment, the receiving module may further receive a recommendation regarding the set of information from the friend via the recommendation interface.

In at least one embodiment, the identifying module may identify the set of information by excluding, from the set of information, information regarding users of the social networking system who are at least one of (1) friends of the participant, or (2) friends of the friend.

In some examples, the above-described method may be encoded as computer-readable instructions on a computer-readable medium. For example, a computer-readable medium may include one or more computer-executable instructions that, when executed by at least one processor of a computing system, may cause the computing system to receive, from a participant of a discovery service of a social networking system, a request for a friend of the participant to assist the participant in making connections with other participants of the discovery service. The computer-readable medium may further include one or more computer-executable instructions that, when executed by at least one processor of the computing system, may cause the computing system to identify at least one set of information that is associated with the discovery service and that is designated as private to the participant.

Additionally, the computer-readable medium may further include one or more computer-executable instructions that, when executed by at least one processor of a computing system, may cause the computing system to provide the friend of the participant with access to at least a portion of the set of information via a recommendation interface that enables the friend of the participant to make recommendations to the participant regarding the set of information to assist the participant in making connections with other participants of the discovery service.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
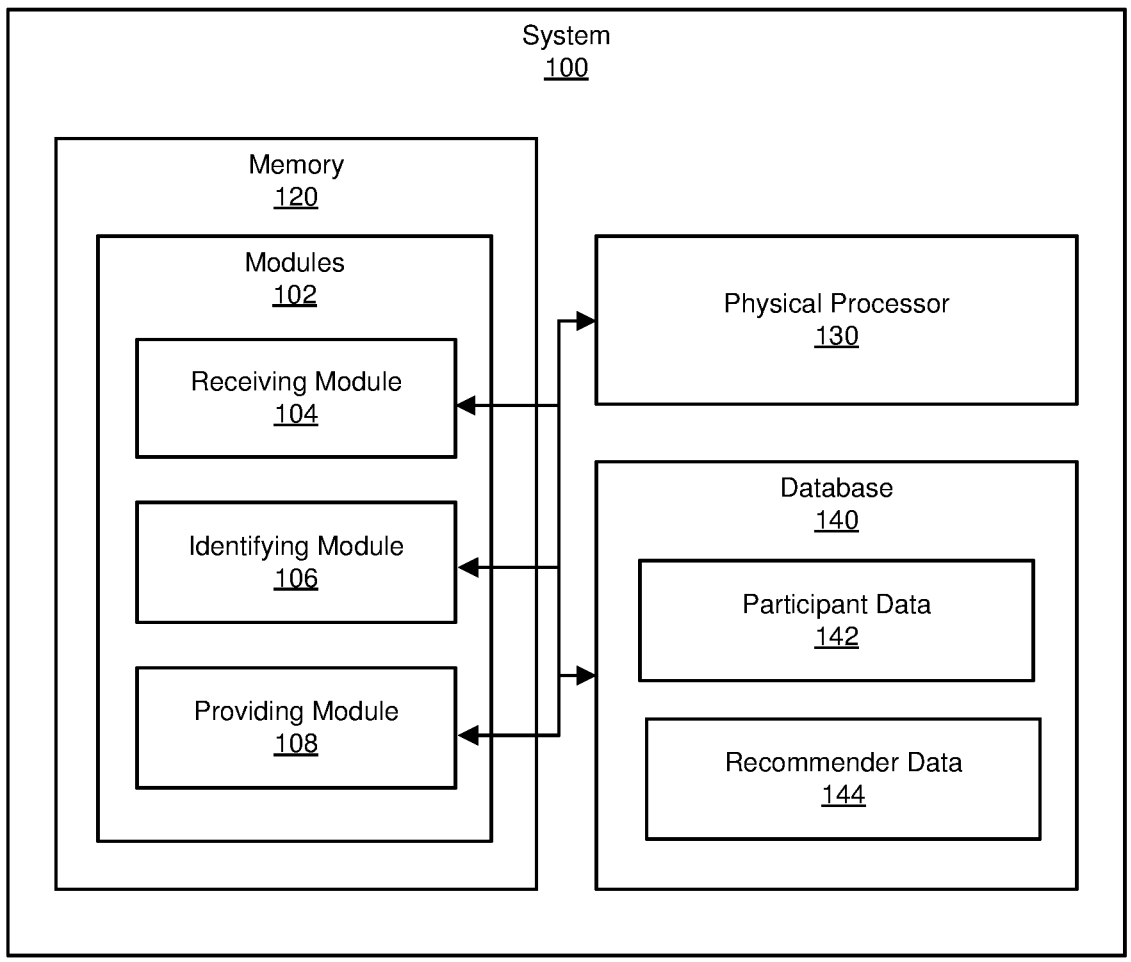
FIG. 1 is a block diagram of an exemplary system for enabling users of a social networking system to assist each other in making connections within the social networking system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for enabling users of a social networking system to assist each other in making connections within the social networking system. As will be explained in greater detail below, embodiments of the instant disclosure may receive, from a participant of a discovery service of a social networking system, a request for a friend of the participant to assist the participant in making connections with other participants of the discovery service. An embodiment may also identify at least one set of information that is associated with the discovery service and that is designated as private to the participant (also referred to herein as "private information" or "private discovery information"), such as a discovery service profile of the participant, a representation of an additional participant in the discovery service of the social networking system (e.g., a discovery service profile, a profile picture, etc.), a participation interface of the social networking system, and so forth.

An embodiment may also provide the friend of the participant with access to at least a portion of the set of information via a recommendation interface that enables the friend of the participant to make recommendations to the participant regarding the set of information to assist the participant in making connections with other participants of the discovery service. A further embodiment may also receive a recommendation regarding the set of information (e.g., a suggested edit for the participant's discovery service profile, a recommendation of an additional participant as a potential connection, etc.) from the friend via the recommendation interface.

By providing the friend of the participant with access to this private information (e.g., information associated with the discovery service and designated as private to the participant) via a recommendation interface that allows the friend to make recommendations to the participant regarding the private discovery information, the systems and methods described herein may enable the friend of the participant to provide useful assistance to the friend as the friend seeks to make dating connections with other participants in the discovery service of the social network. For example, the systems and methods described herein may enable the friend of the participant to provide the participant with useful feedback regarding the participant's discovery service profile, recommendations regarding potential connections, and so forth. Therefore, the systems and methods described herein may improve the quality and/or quantity of connections the participant may establish with other participants in the discovery service of the social network.

Additionally, embodiments of the instant disclosure may provide for a more efficient usage of telecommunications resources (e.g., network bandwidth, computing resources, etc.) than traditional methods of making connections within a social networking system and/or a discovery service of a social networking system. For example, the systems and methods described herein may enable a friend of a participant to provide recommendations regarding potential connections to the participant. Thus, the participant may obtain additional useful information regarding potential connections, and may therefore choose to access only discovery profile information associated with those recommended potential dating connections instead of randomly browsing discovery service profile information of a potentially larger, less targeted group of other participants. This may conserve bandwidth resources of a computing device of the participant, the social networking system, and/or the dating service.

The following will provide, with reference to FIGS. 1-2 and 4-8, detailed descriptions of systems for enabling users of a social networking system to assist each other in making connections within the social networking system. Detailed descriptions of corresponding computer-implemented methods will also be provided in connection with FIG. 3.

FIG. 1 is a block diagram of an exemplary system 100 for enabling users of a social networking system to assist each other in making connections within the social networking system. As illustrated in this figure, exemplary system 100 may include one or more modules 102 for performing one or more tasks. As will be explained in greater detail below, modules 102 may include a receiving module 104 that receives, from a participant of a discovery service of a social networking system, a request for a friend of the participant to assist the participant in making connections with other participants of the discovery service.

Exemplary system 100 may additionally include an identifying module 106 that identifies at least one set of information that is associated with the discovery service and that is designated as private to the participant. Additionally, exemplary system 100 may also include a providing module 108 that provides the friend of the participant with access to at least a portion of the set of information via a recommendation interface that enables the friend of the participant to make recommendations to the participant regarding the set of information to assist the participant in making connections with other participants of the discovery service.

As further illustrated in FIG. 1, exemplary system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, exemplary system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate users of a social networking system assisting each other in making dating connections within the social networking system. Examples of physical processor 130 may include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also illustrated in FIG. 1, exemplary system 100 may also include one or more databases, such as database 140. In at least one example, database 140 may include participant data 142 for storing information associated with participants of a discovery service of a social networking system, and/or recommender data 144 for storing information regarding potential recommendation sources (e.g., potential recommenders). Database 140 may represent portions of a single database or computing device or a plurality of databases or computing devices. In some embodiments, database 140 may be a logical container for data and may be implemented in various forms (e.g., a database, a file, a data structure, etc.).

Figure 2:
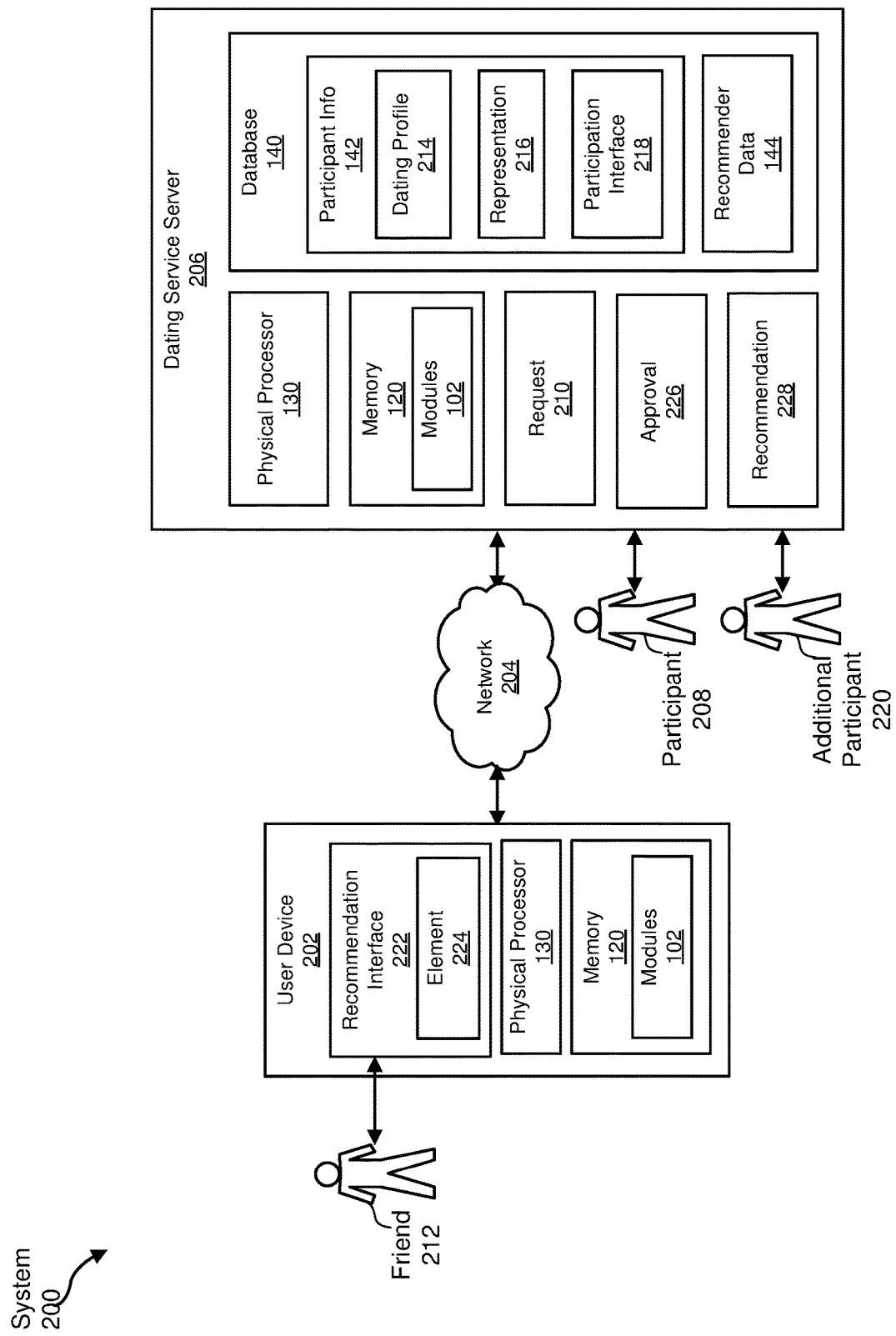
FIG. 2 is a block diagram of an exemplary implementation of a system for enabling users of a social networking system to assist each other in making connections within the social networking system.

Exemplary system 100 in FIG. 1 may be implemented in a variety of ways. For example, all or a portion of exemplary system 100 may represent portions of an exemplary system 200 ("system 200") in FIG. 2. As shown in FIG. 2, system 200 may include user device 202 in communication with a discovery service server 206 ("server 206") via network 204. In at least one example, user device 202 may be programmed with one or more of modules 102. Additionally or alternatively, server 206 may be programmed with one or more of modules 102.

In at least one embodiment, one or more modules 102 from FIG. 1 may, when executed by user device 202 and/or server 206, enable user device 202 and/or server 206 to perform one or more operations to enable users of a social network users to assist each other in making dating connections within the social network. For example, as will be described in greater detail below, receiving module 104 may cause user device 202 and/or server 206 to receive, from a participant (e.g., participant 208) of a discovery service of a social networking system, a request (e.g., request 210) for a friend of the participant (e.g., friend 212) to assist the participant in making connections with other participants of the discovery service. In some examples, the friend of the participant may be a relative (e.g., a person who is connected to the participant by blood, marriage, operation of law, etc.) of the participant.

Furthermore, identifying module 106 may cause user device 202 and/or server 206 to identify at least one set of information (e.g., a set of information included in participant data 142) that is associated with the discovery service and that is designated as private to the participant.

In some examples, the discovery service may include a dating service of the social networking system. In at least some such examples, the set of information may include a dating profile of the participant (e.g., dating profile 214). In further examples, the set of information may include a representation (e.g., representation 216) of at least one additional participant (e.g., additional participant 220) in the dating service of the social networking system. In additional examples, the set of information may include an interface of the social networking system (e.g., participation interface 218) that visually indicates, when representing an additional user of the social networking system (e.g., additional participant 220) within the social networking system, whether the additional user is also participating in the dating service of the social networking system.

In at least one embodiment, identifying module 106 may cause user device 202 and/or server 206 to identify the set of information by excluding, from the set of information, information regarding users of the social networking system who are (1) friends of the participant, or (2) friends of the friend.

Additionally, providing module 108 may cause user device 202 and/or server 206 to provide the friend of the participant (e.g., friend 212) with access to at least a portion of the set of information (e.g., information included in participant data 142) via a recommendation interface (e.g., recommendation interface 222) that enables the friend of the participant to make recommendations to the participant (e.g., participant 208) regarding the set of information to assist the participant in making connections with other participants of the discovery service.

As mentioned above, in at least some examples, the set of information may include a dating profile of the participant (e.g., dating profile 214). In some of those examples, the recommendation interface (e.g., recommendation interface 222) may include at least one interface element (e.g., element 224) that enables the friend of the participant to recommend at least one change to the dating profile to the participant.

In at least one embodiment, the set of information may include a representation (e.g., representation 216) of at least one additional participant in the dating service of the social networking system (e.g., additional participant 220). In some embodiments, providing module 108 may provide the friend (e.g., friend 212) with access to at least a portion of the set of information via the recommendation interface (e.g., recommendation interface 222) by presenting the representation of the additional participant (e.g., representation 216) to the friend via the recommendation interface. In some examples, the recommendation interface may include an interface element (e.g., element 224) that enables the friend to recommend the additional participant to the participant as a potential connection.

In some additional examples, the set of information (e.g., information included in participant data 142) may include an interface of the social networking system (e.g., participation interface 218) that visually indicates, when representing an additional user of the social networking system within the social networking system, whether the additional user is also participating in the dating service of the social networking system. In some examples, the recommendation interface (e.g., recommendation interface 222) may include an interface element (e.g., element 224) that enables the friend to recommend the additional user to the participant as a potential connection when the interface of the social networking system visually indicates that the additional user is also participating in the dating service of the social networking system.

In some embodiments, one or more of modules 102 (e.g., receiving module 104, identifying module 106, and/or providing module 108) may cause user device 202 and/or server 206 to present the request (e.g., request 210) for the friend (e.g., friend 212) of the participant (e.g., participant 208) to assist the participant in making connections with other participants of the discovery service to the friend of the participant, and/or may cause user device 202 and/or server 206 to acquire, from the friend of the participant, an approval of the request (e.g., approval 226). In at least one embodiment, one or more of modules 102 (e.g., receiving module 104, identifying module 106, and/or providing module 108) may provide the friend (e.g., friend 212) with access to the portion of the set of information via the recommendation interface in response to the acquisition of the approval of the request.

In some additional embodiments, one or more of modules 102 (e.g., receiving module 104, identifying module 106, and/or providing module 108) may cause user device 202 and/or server 206 to prevent the friend (e.g., friend 212) from viewing the set of information (e.g., participant data 142) via the recommendation interface (e.g., recommendation interface 222) after an expiration of a predefined period of time, and/or may prevent the friend (e.g., friend 212) from making more than a predetermined amount of recommendations during a predefined period of time.

In at least some examples, one or more of modules 102 (e.g., receiving module 104, identifying module 106, and/or providing module 108) may cause user device 202 and/or server 206 to recommend a user of the social networking system (e.g., friend 212) to the participant (e.g., participant 208) as a potential source of recommendations. In at least one example, recommending the user of the social networking system to the participant may be based on at least one of (1) previous experience of the user in making recommendations to assist participants of the discovery service in making connections with other participants of the discovery service, or (2) a relationship of the user to the participant.

In some embodiments, one or more of modules 102 (e.g., receiving module 104, identifying module 106, and/or providing module 108) may cause user device 202 and/or server 206 to receive, from the participant in the discovery service of the social networking system (e.g., participant 208), an additional request for at least one additional friend of the participant to assist the participant in making connections with other participants of the discovery service. In some examples, while providing the friend of the participant with access to the set of information via the recommendation interface, one or more of modules 102 (e.g., receiving module 104, identifying module 106, and/or providing module 108) may cause user device 202 and/or server 206 to provide the additional friend of the participant with access to the set of information via an additional recommendation interface that enables the additional friend of the participant to make recommendations to the participant regarding the set of information.

User device 202 generally represents any type or form of computing device capable of reading and/or executing computer-executable instructions. In at least one embodiment, user device 202 may accept one or more directions from server 206. Examples of user device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

Network 204 generally represents any medium or architecture capable of facilitating communication and/or data transfer between user device 202 and/or server 206. Examples of network 204 include, without limitation, an intranet, a wide-area network (WAN), a local area network (LAN), a personal area network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, and the like. Network 204 may facilitate communication or data transfer using wireless or wired connections. In at least one embodiment, network 204 may facilitate communication between user device 202 and server 206.

Server 206 generally represents any type or form of computing device capable of reading and/or executing computer-executable instructions and/or hosting executables. Examples of server 206 include, without limitation, application servers, storage servers, database servers, web servers, and/or any other suitable computing device configured to run certain software applications and/or provide various application, storage, and/or database services.

In at least one example, user device 202 and server 206 may be computing devices programmed with one or more of modules 102. All or a portion of the functionality of modules 102 may be performed by user device 202, server 206, and/or any other suitable computing system. As will be described in greater detail below, one or more of modules 102 from FIG. 1 may, when executed by at least one processor of user device 202 and/or server 206, enable user device 202 and/or server 206 to enable social network users to assist each other in making dating connections within the social network.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the exemplary embodiments disclosed herein may be encoded as a computer program (also referred to as computer software, software applications, computer-readable instructions, and/or computer control logic) on a computer-readable medium (e.g., a transitory or non-transitory computer-readable medium).

Figure 3:
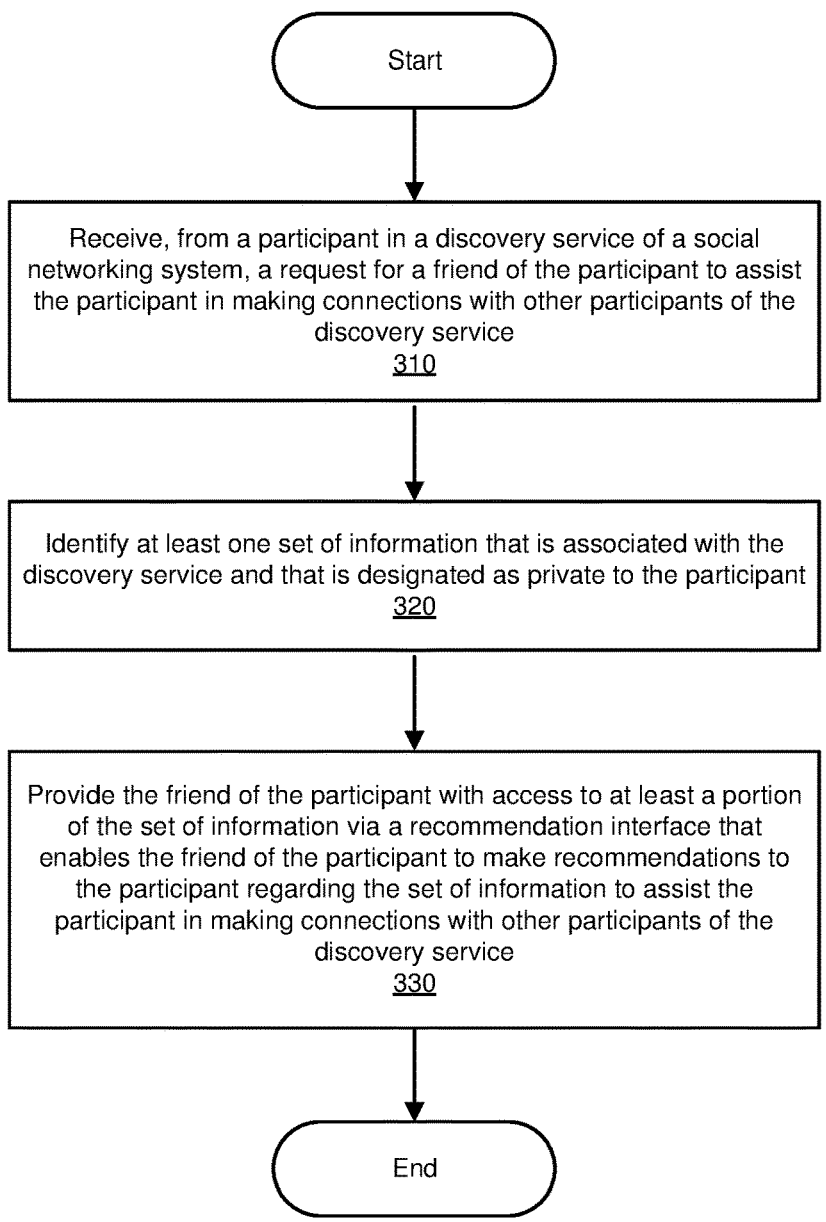
FIG. 3 is a flow diagram of an exemplary method for enabling users of a social networking system to assist each other in making connections within the social networking system.

FIG. 3 is a flow diagram of an exemplary computer-implemented method 300 for enabling users of a social networking system to assist each other in making dating connections within the social networking system. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may receive, from a participant of a discovery service of a social networking system, a request for a friend of the participant to assist the participant in making connections with other participants of the dating service. For example, receiving module 104 may, as part of user device 202 and/or server 206, cause user device 202 and/or server 206 to receive, from participant 208, request 210 for friend 212 to assist participant 208 in making connections with other participants of the dating service.

In some examples, a "social networking system" may include any computing device and/or devices, software framework, and/or combination thereof usable for providing and/or hosting a service (e.g., via the Internet). In some examples, the phrase "social networking system" may refer to a computing platform that provides a social networking service. As used herein, the phrase "social networking service" may refer to any service and/or Internet site that manages social connections and/or shares, compiles, formats, and/or broadcasts information based on social connections.

In some examples, a "friend" may be any social connection maintained by the social networking system between two users of the social networking system. In additional examples, a friend may include any person with whom a user of a social networking system maintains a social connection via a social networking system. For example, a friend may include, without limitation, a relative, an acquaintance, a colleague, a contact, a professional relation, and so forth with whom a user of a social networking system maintains a social connection via a social networking system.

As noted above, in some examples, the friend of the participant may be a relative of the participant. In some examples, a "relative" may include any person who is connected to the participant by blood, marriage, operation of law, or other similar relationship. A relative of a participant may include, without limitation, a grandparent, a parent, a child, a grandchild, a sibling, a sibling of a parent (e.g., an aunt or uncle), a cousin, a child of a sibling (e.g., a niece or nephew), a relative-in-law, and so forth.

In at least some embodiments, a "discovery service" or "discovery service of a social networking system" may include any service of a social networking system that facilitates discovery by a user of a social networking system of other users of the social networking system. In some embodiments, a discovery service may facilitate discovery by a user of other users based on any suitable factors, including, but not limited to, a set of shared attributes of the user and discoverable users, mutual participation in services of the social networking system by the user and discoverable users, a set of attributes of discoverable users defined by the user, and so forth. In at least some embodiments, a discovery service may limit the scope of users that the user may discover. For example, the discovery service may prevent the user from discovering other users of the social networking system with whom the user already shares a friend relationship within the social networking system.

In some examples, a "dating service" or "dating service of a social networking system" may be any service of a social networking system that manages dating connections and/or shares, compiles, formats, and/or broadcasts information based on dating connections. In some examples, a dating service may be included as part of a discovery service. In some examples, a "dating connection" and "a connection within a dating service" may be any social connection between at least two participants of a dating service of a social networking system that represents an interest by at least one of the participants in engaging in dating practices with the other participant or participants.

In some examples, a "request" may include any information that indicates that a participant of a discovery service of a social networking system desires assistance from a friend of the participant in making connections (e.g., social connections, dating connections, etc.) with other participants in the dating service. For example, a request (e.g., request 210) may include an instruction for one or more of the systems described herein to provide a friend of the participant (e.g., friend 212) with access to information that is associated with the discovery service and that is designated as private to the participant. In some examples, a request (e.g., request 210) may further include a message from the participant to the friend, such as a message requesting assistance from the friend.

Receiving module 104 may receive, from participant 208, request 210 for friend 212 to assist participant 208 in making connections with other participants of the discovery service in any suitable way. For example, participant 208 may submit a request for assistance from friend 212 via a user interface of the discovery service of the social networking system. Receiving module 104 may then receive request 210 via a messaging feature of the social networking system. As another example, participant 208 may contact and request assistance from friend 212 outside of the social networking system, and may provide friend 212 with access information (e.g., an access code, a password, a permission code, etc.) that indicates that participant 208 desires assistance from friend 212. If friend 212 decides to assist participant 208, friend 212 may enter the access information into a suitable interface of the dating service of the social networking system. This may then cause receiving module 104 to receive request 210 from participant 208 via the discovery service.

By requesting assistance in making dating connections from a friend, a participant of the discovery service of the social networking system may gain valuable recommendations and/or advice from a trusted friend. This may be congruent and/or consistent with a real-world practice of asking trusted real-world contacts (friends, family members, community members, etc.) for advice regarding identifying potential social connections and/or forming relationships with potential social connections. For example, when a person in the real world wishes to make dating connections, he or she may seek assistance from a "wingman," who may be a trusted friend, relative, or other associate. The systems and methods described herein may enable a user to enlist similar assistance from friends within a social networking system when attempting to make dating connections within a dating service of the social networking system. Additionally, some may value family and/or community involvement in the dating and/or courtship process. The systems and methods described herein may facilitate a participant in a dating service requesting assistance from a family member (e.g., a relative) in making dating connections within the dating service.

Returning to FIG. 3, at step 320, one or more of the systems described herein may identify at least one set of information that is associated with the discovery service and that is designated as private to the participant. For example, identifying module 106 may identify at least one set of information included in participant data 142 that is associated with the discovery service and that is designated as private to participant 208 (e.g., dating profile 214, representation 216, participation interface 218, etc.).

In some embodiments, the discovery service may include a dating service of the social networking system. In some such embodiments, the set of information may include a dating profile of the participant (e.g., dating profile 214). In some examples, a "dating profile" may include any suitable information that a participant in the dating service (e.g., participant 208) may wish to share with other participants in the dating service, but wishes to keep private from users of the social networking system who are not participating in the dating service. For example, dating profile 214 may include, without limitation, an image of participant 208, a text description of participant 208, a set of interests of participant 208, a relationship status of participant 208, a geographic location associated with participant 208, a set of physical attributes of participant 208, and so forth. A dating profile may be separate and distinct from a user profile of the participant that may be viewable by users of the social networking system.

In further embodiments, the set of information may include a representation of at least one additional participant in the dating service of the social networking system (e.g., additional participant 220). In some examples, the representation (e.g., representation 216) may include any information that may represent the additional participant in the dating service of the social networking system. For example, representation 216 may include, without limitation, a dating profile of additional participant 220, an image of additional participant 220, a textual description of additional participant 220, a relationship status of additional participant 220, and so forth.

In additional examples, the set of information may include an interface of the social networking system that visually indicates, when representing an additional user of the social networking system within the social networking system, whether the additional user is also participating in the dating service of the social networking system. Examples and illustrations of such an interface (e.g., participation interface 218) will be provided in greater detail below in reference to FIG. 7.

Identifying module 106 may identify the set of information that is associated with the discovery service and that is designated as private to the participant in a variety of contexts. For example, identifying module 106 may identify the set of information by accessing participant data 142 stored in database 140, and may therefore identify any private discovery information associated with participant 208 included in participant data 142 including, without limitation, dating profile 214, representation 216, and/or participation interface 218.

In some contexts, identifying module 106 may identify the set of information by excluding, from the set of information, information regarding users of the social networking system who are friends of the participant (e.g., participant 208), and/or who are friends of the friend (e.g., friend 212). In this way, the systems and methods described herein may limit participants that friend 212 may recommend to participant 208 as potential connections (e.g., potential dating connections) to participants who are not friends of participant 208 and/or who are not friends of the friend 212. Thus, friend 212 may only be provided with information associated with participants who are friends of friends of participant 208, friends of friends of friend 212, and/or who are not friends of either participant 208 or friend 212.

By way of example, as mentioned above, participant data 142 may include a plurality of dating profiles associated with participants of the dating service. In identifying representation 216, identifying module 106 may exclude from representation 216 dating profiles of participants who are friends of friend 212 and/or participants who are friends of participant 208. This may broaden the scope of participants that friend 212 may recommend to participant 208 as potential connections to participants who are not already connected with (e.g., are not already friends with) participant 208 and/or friend 212.

Returning to FIG. 3, at step 330, one or more of the systems described herein may provide the friend of the participant with access to at least a portion of the set of information via a recommendation interface that enables the friend of the participant to make recommendations to the participant regarding the set of information to assist the participant in making connections with other participants of the discovery service. For example, providing module 108 may, as part of user device 202 and/or server 206, provide friend 212 with access to a portion of participant data 142 (e.g., dating profile 214, representation 216, and/or participation interface 218) via recommendation interface 222. Recommendation interface 222 may enable friend 212 to make recommendations (e.g., recommendation 228) to participant 208 regarding the set of information (e.g., dating profile 214, representation 216, and/or participation interface 218) to assist participant 208 in making connections with other participants of the discovery service.

In some examples, a "recommendation interface" may include any suitable user interface that may (1) provide a user (e.g., friend 212) with access to at least a portion of a set of information that is associated with a discovery service of a social networking system and that is designated as private to a participant in the discovery service, and (2) enable the user to make recommendations to the participant (e.g., participant 208) regarding the set of information. In some examples, a recommendation interface may incorporate and/or utilize user interface elements (e.g., graphical user interface elements) provided by any suitable operating system, interface design framework, user interface toolkit, or custom user interface tool set. Various examples and illustrations of recommendation interfaces will be provided below in reference to FIGS. 4-7.

Providing module 108 may provide friend 212 with access to the set of information (e.g., dating profile 214, representation 216, participation interface 218, etc.) via recommendation interface 222 in a variety of contexts. For example, as mentioned above, in some embodiments, participant data 142 may include a dating profile 214. Identifying module 106 may identify dating profile 214 in any of the ways described herein, and providing module 108 may provide at least a portion of dating profile 214 to friend 212 via recommendation interface 222.

In some embodiments, recommendation interface 222 may include an interface element, such as element 224, that may enable the friend of the participant to make recommendations regarding the set of information (e.g., any of the information included in participant data 142). For example, element 224 may include, without limitation, a graphical button, a checkbox, a radio button, a dropdown list, a list box, a toggle, a text field, and so forth. In further examples, element 224 may include a haptic (e.g., touchable) control, such as a touch control, a swipe control, a pinch control, a gesture control, etc. A user (e.g., friend 212) may interact with element 224 to make recommendations regarding the set of information.

For example, in situations where the set of information includes dating profile 214, element 224 may enable friend 212 to recommend at least one change to the dating profile 214 to participant 208. Element 224 may include any suitable interface element that may enable friend 212 to recommend a change to dating profile 214 to participant 208. For example, element 224 may include a graphical button. Friend 212 may interact with (e.g., select, tap on, click on, etc.) the graphical button to recommend a change to dating profile 214 to participant 208. As another example, element 224 may include a haptic control configured to receive a swipe gesture to indicate that friend 212 wishes to recommend a change to dating profile 214. Friend 212 may therefore recommend a change to dating profile 214 by inputting a suitable swipe gesture via element 224.

Figure 4:
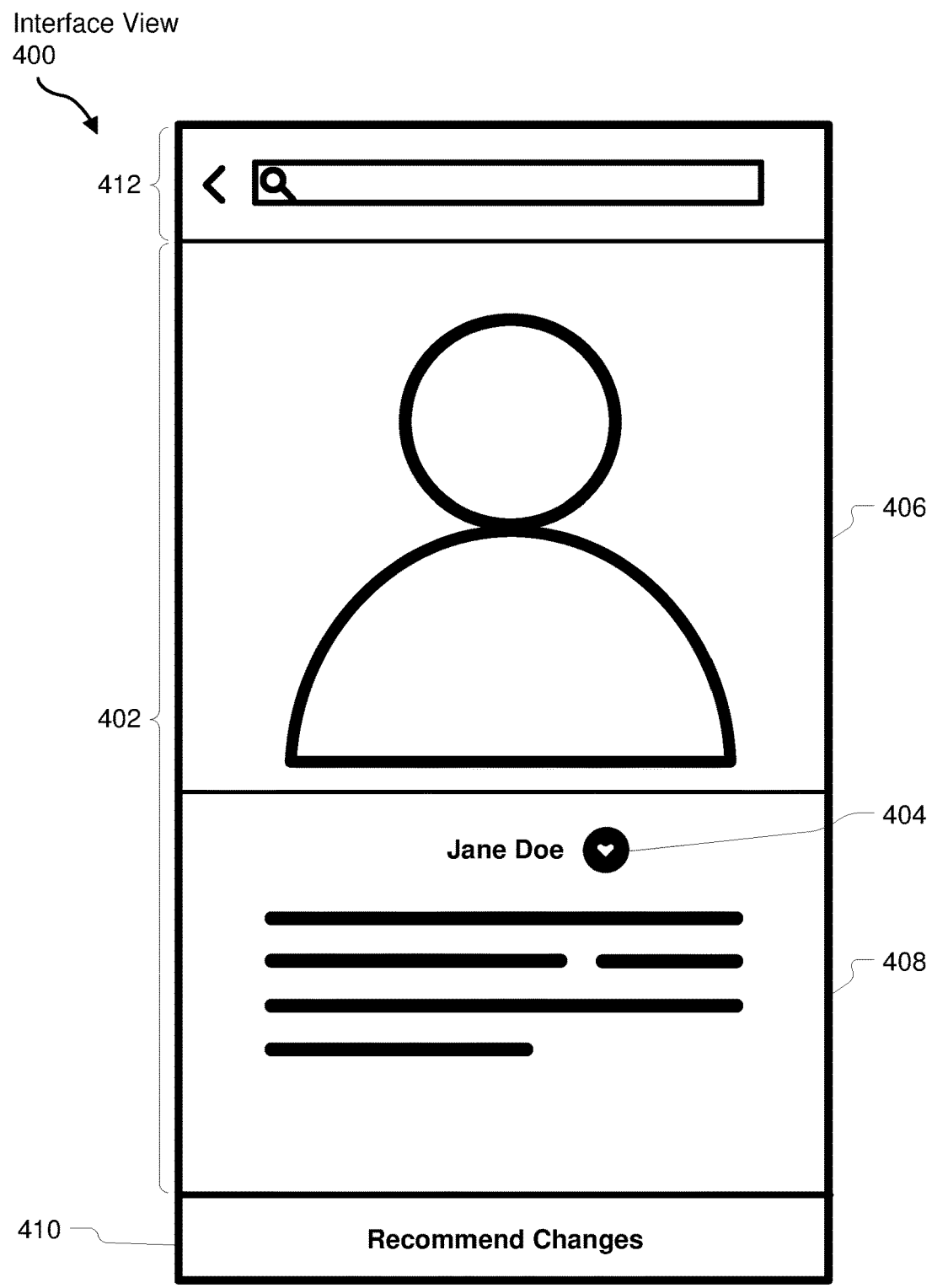
FIG. 4 is an interface view that illustrates a recommendation interface that includes an interface element that enables a friend of a participant of a dating service of a social networking system to recommend changes to the dating profile of the participant.

By way of illustration, FIG. 4 shows an interface view 400 that shows a version of recommendation interface 222 that includes an element 224 that enables a friend of a participant of a dating service of a social networking system to recommend changes to a dating profile of the participant. As shown, interface view 400 includes a profile view 402 that may show at least a portion of dating profile 214 of participant 208. Profile view 402 may include an indicator 404 that may indicate that profile view 402 shows a dating profile of participant 208, rather than a social networking system user profile of participant 208.

Profile view 402 may include a profile image 406, which may be an image included in dating profile 214 and selected by participant 208 to represent participant 208 within a dating service of a social networking system. Likewise, profile view 402 may include profile description 408, which may be a description of participant 208 included in dating profile 214. Profile description 408 may be created by participant 208; additionally or alternatively, profile description 408 may be at least partially generated by a dating service. Profile description 408 may include any suitable media including, without limitation, a textual message from participant 208 to other participants in the dating service, a listing of interests of participant 208, a set of attributes of participant 208 (e.g., physical attributes, geographic location, sexual orientation, sexual identity, religious views, etc.), a set of attributes that participant 208 desires in potential dating connections, a media content item (e.g., video, audio, image, text, etc.) associated with and/or selected by participant 208, and so forth.

Interface view 400 also includes a button 410. Button 410 may be an interface element (e.g., element 224) that a friend (e.g., friend 212) may interact with (e.g., select, tap on, click on, etc.) in order to recommend one or more changes to information displayed in profile view 402. Interface view 400 further includes additional elements 412 that may include navigational and/or search elements that may be part of an interface of a social networking system and/or a discovery service of a social networking system.

Figure 5:
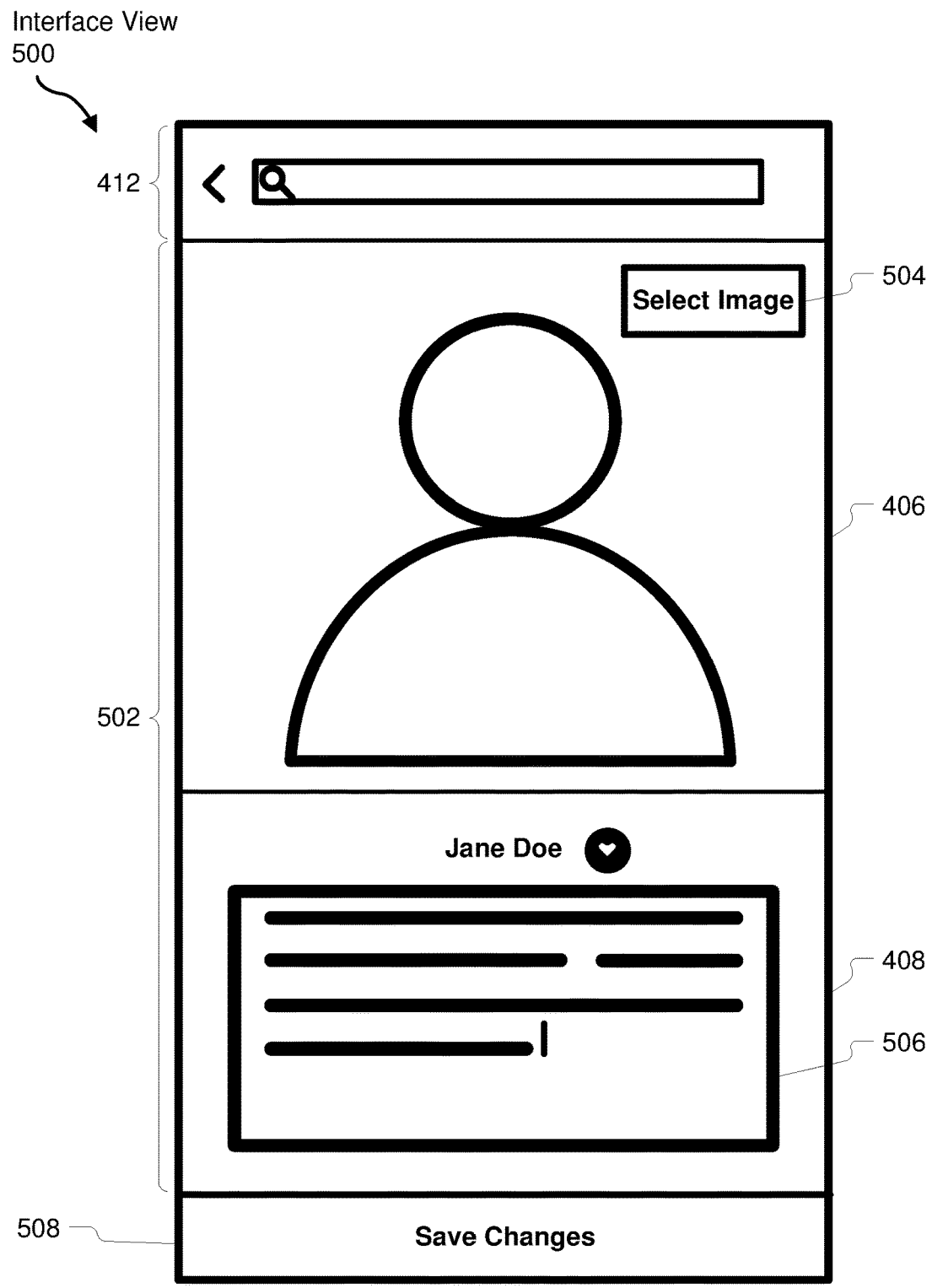
FIG. 5 is an interface view that illustrates an editing interface that enables a friend of a participant of a dating service of a social networking system to edit a dating profile of the participant.

FIG. 5 shows an interface view 500, which may be a representation of interface view 400 after friend 212 has indicated that he or she wishes to recommend one or more changes to dating profile 214 to participant 208 by interacting with (e.g., selecting, tapping on, clicking on, etc.) button 410. Interface view 500 may include profile editing view 502 that, like profile view 402, includes profile image 406 and profile description 408. However, unlike profile view 402, profile editing view 502 includes interface element 504 and text box 506.

In this illustration, friend 212 may select interface element 504 to recommend a change to profile image 406, and/or may edit the media (e.g., text, images, etc.) included in text box 506 to recommend a change to profile description 408. The friend may then select button 508, which may cause receiving module 104 to receive the recommended changes as recommendation 228 via recommendation interface 222.

As will be described in greater detail below, recommendation 228 may include any suitable information that may indicate to participant 208 that friend 212 recommends at least one of (1) a change to at least a portion of the identified set of information (e.g., dating profile 214 included in participant data 142), or (2) an additional participant in the dating service as a potential dating connection for the participant.

For example, upon receiving a selection by friend 212 of interface element 504, receiving module 104 may receive recommendation 228 by sending a message to participant 208 that indicates that friend 212 recommends that participant 208 change profile image 406. In other examples, upon receiving a selection by friend 212 of interface element 504, providing module 108 may cause recommendation interface 222 to present friend 212 with an image selection interface that enables friend 212 to select a new image to replace profile image 406. In such examples, receiving module 104 may receive recommendation 228 via recommendation interface 222 by receiving the new image by way of the image selection interface, and/or by replacing profile image 406 with the new image.

Similarly, in some embodiments, friend 212 may make changes (e.g., additions, deletions, comments, etc.) to the media (e.g., text, images, audio, etc.) included in text box 506. In such embodiments, receiving module 104 may receive recommendation 228 via recommendation interface 222 by receiving the changed media and/or by replacing profile description 408 with the changed media when friend 212 selects button 508.

In additional embodiments, as mentioned above, the set of information (e.g., participant data 142) may include representation 216, which may be a representation (e.g., an image, a dating profile, a textual description, etc.) of an additional participant in the dating service of the social networking system. Thus, in some embodiments, providing module 108 may provide friend 212 with access to at least a portion of the set of information via recommendation interface 222 by presenting at least a portion of representation 216 to friend 212 via recommendation interface 222. In such examples, recommendation interface 222 may include an interface element (e.g., element 224) that enables friend 212 to recommend additional participant 220 to participant 208 as a potential connection.

Figure 6:
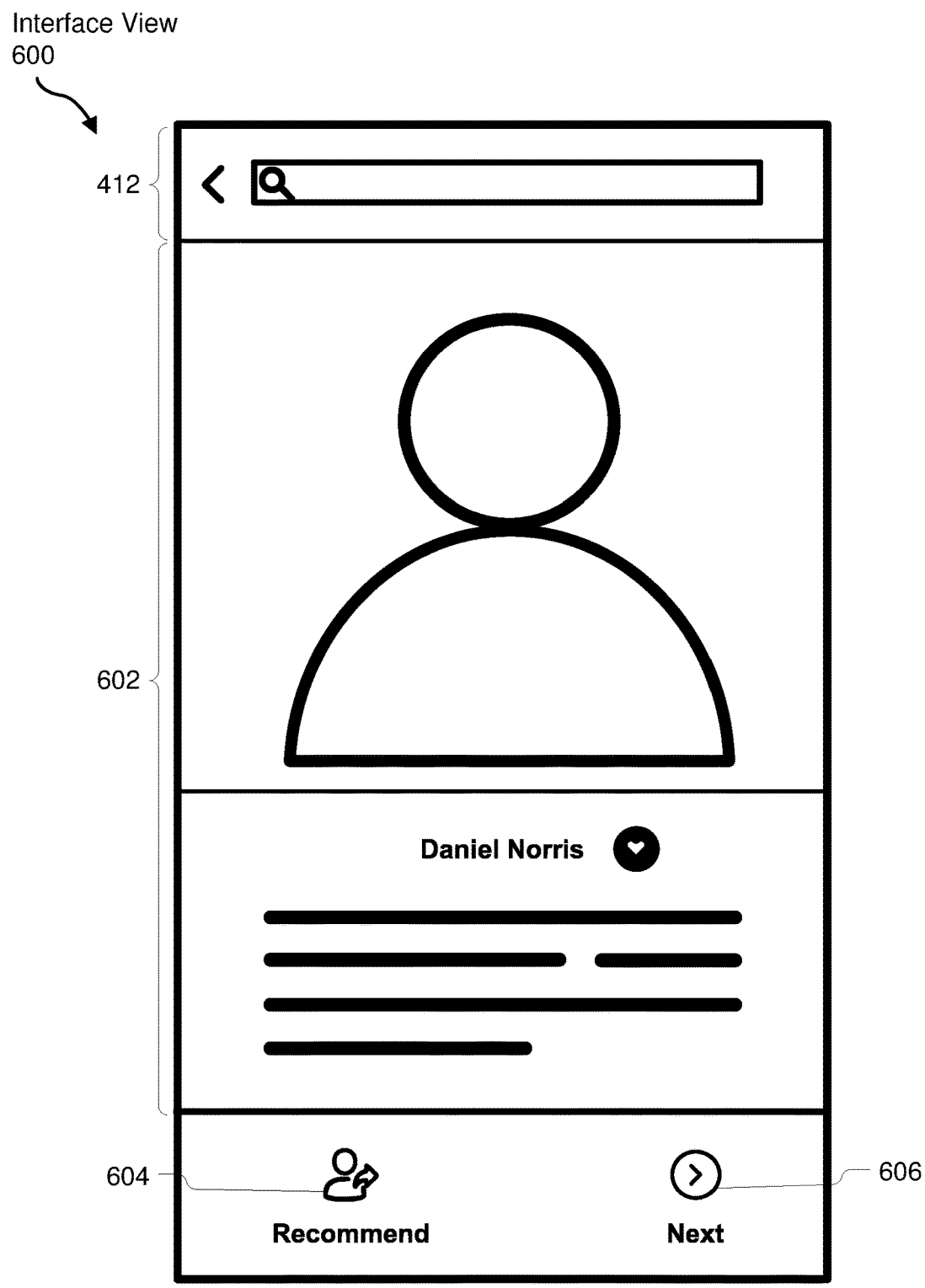
FIG. 6 is an interface view that illustrates a recommendation interface that presents, to a friend of a participant of a dating service of a social networking system, a representation of an additional participant in the dating service.

To illustrate, FIG. 6 shows an interface view 600 that shows a version of recommendation interface 222 that includes at least one interface element that enables friend 212 to recommend an additional participant to participant 208 as a potential connection. As shown, interface view 600 includes a dating profile view 602, which may present at least a portion of a dating profile associated with additional participant 220 to friend 212. As indicated by dating profile view 602, additional participant 220 is named Daniel Norris.

Interface view 600 may additionally include a recommendation control 604 and a next profile control 606. Upon reviewing dating profile view 602, friend 212 may select recommendation control 604, which may cause receiving module 104 to receive a recommendation (e.g., recommendation 228) which may indicate that friend 212 recommends additional user 220 to participant 208 as a potential connection. Additionally, friend 212 may select next profile control 606, which may cause receiving module 104 to receive a next profile command instead of a recommendation.

In response to receiving either a recommendation or a next profile command, one or more modules 102 (e.g., receiving module 104, identifying module 106, and/or providing module 108) may identify a new representation of another participant in the dating service of the social networking system, and may present the new representation to friend 212 via recommendation interface 222 (e.g., in replacement of dating profile view 602). This process of presenting friend 212 with a dating profile associated with an additional participant in the dating service, receiving a recommendation or a next profile command, identifying a new representation of another participant in the dating service, and presenting the new representation to friend 212, may continue until friend 212 chooses to exit interface view 600, or until an expiration of a time limit for access for friend 212 to the private dating information of participant 208.

In additional embodiments, as mentioned above, the set of information may include an interface of the social networking system (e.g., participation interface 218) that visually indicates, when representing an additional user of the social networking system within the social networking system (e.g., within a content feed, a group listing, a set of search results, a comment interface, etc.), whether the additional user is also participating in the discovery service (e.g., the dating service) of the social networking system. By visually indicating users of the social networking system who are also participating in the discovery service of the social networking system, providing module 108 may enable friend 212 to quickly distinguish users of the social networking system who may be interested in making a connection (e.g., a dating connection) with participant 208 from users of the social networking system who may not be interested in making a connection (e.g., a dating connection) with participant 208.

In some examples, participation interface 218 may include any suitable interface element (e.g., an icon, an affordance, a segment of text, etc.) that may visually indicate that a particular user of a social networking system is also a participant of a discovery service (e.g., a dating service) of the social networking system. In some embodiments, participation interface 218 may additionally reflect a determination by the dating service that the user meets a predetermined level of compatibility with participant 208 within the dating service.

Figure 7:
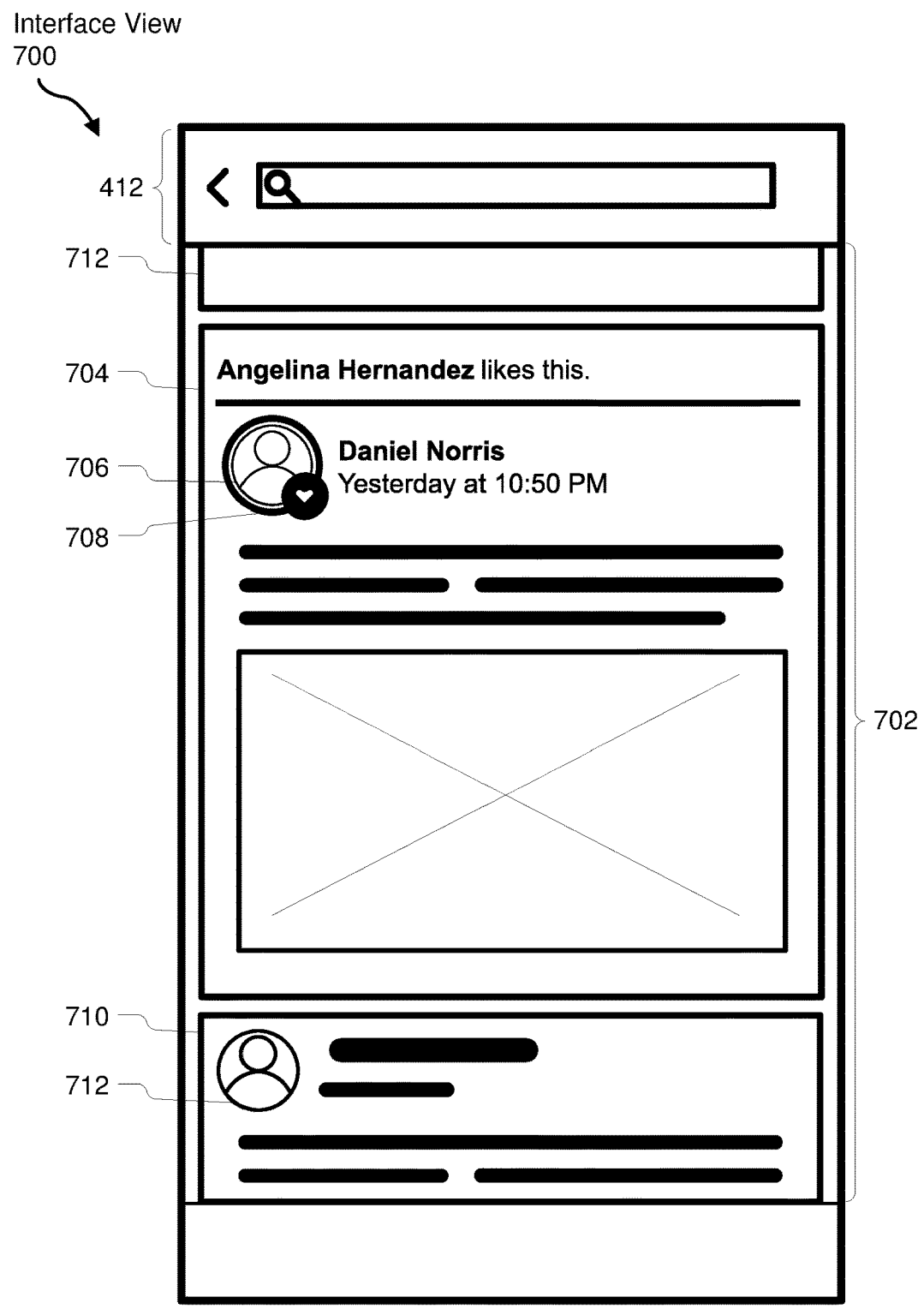
FIG. 7 is an interface view that illustrates an interface of a social networking system that visually indicates, to a friend of a participant of a dating service of the social networking system when representing an additional user of the social networking system within the social networking system, whether the additional user is also participating in the dating service.

By way of illustration, FIG. 7 shows an interface view 700 that shows a version of recommendation interface 222 that includes an interface of a social networking system that visually indicates, when representing an additional user of the social networking system within the social networking system, whether the additional user is also participating in the discovery service (e.g., the dating service). As shown, interface view 700 includes a content feed 702 of the social networking system that the social networking system may generate and show to friend 212. Content feed 702 may include one or more news stories, media items, postings, and so forth, that friends of friend 212 have shared via the social networking system. Content feed 702 may include a posting 704, which may be a news story shared by user Daniel Norris. Posting 704 includes a profile picture 706 of user Daniel Norris.

Posting 704 further includes affordance 708 surrounding and/or visually associated with profile picture 706. Affordance 708 may be any indicator associated with a representation of a user of the social networking system that indicates that the user is participating in a discovery service (e.g., a dating service) of the social networking system. Hence, as shown, affordance 708 may indicate that user Daniel Norris is participating in a dating service of the social networking system. Therefore, by viewing interface view 700, friend 212 may readily identify user Daniel Norris as a potential connection (e.g., a potential dating connection) for participant 208.

Conversely, interface view 700 further includes posting 710, which may be a posting (e.g., a news story, a media item, a status update, etc.) posted by another user of the social networking system who is not participating in the dating service. Hence, profile picture 712, associated with the user who posted posting 710, does not include an affordance (e.g., an affordance similar to affordance 708) that indicates that the user is participating in a dating service of the social networking system. Thus, by viewing interface view 700, friend 212 may readily determine that the author of posting 710 is not participating in the dating service, and therefore may not be recommended to participant 208 as a potential dating connection.

Affordance 708 may only be visible to other users of the social networking system who are participating in the discovery service (e.g., the dating service) of the social network, or friends of participants in the discovery service who the participants have requested to assist them in making connections (e.g., dating connections) with other participants of the discovery service. Hence, interface view 700 (e.g., as an implementation of participation interface 218) may be private to participant 208, but may be provided to friend 212 in accordance with the systems and methods described herein.

Additionally, while interface view 700 shows a content feed interface of the social networking system, participation interface 218 may cause (e.g., direct, instruct, command, etc.) providing module 108 to apply visual indicators similar to affordance 708 to representations of users within any other interface of the social networking system that presents representations of users of the social networking system to friend 212. For example, participation interface 218 may cause providing module 108 to apply visual indicators similar to affordance 708 to representations of users in a group interface (e.g., representations of group members who are participating in the dating service may include visual indicators like affordance 708), search results (e.g., representations of users who appear in search results presented to friend 212 and who are also participating in the dating service may include visual indicators like affordance 708), comment interfaces (e.g., representations of users who submit a comment to a posting and who are also participating in the dating service may include visual indicators like affordance 708) and so forth.

Additionally, friend 212 may interact with (e.g., tap on, click on, select, etc.) affordance 708 and/or any other interface element associated with affordance 708 (e.g., a profile picture, a posting, a printed name, etc.). Upon detecting such an interaction, providing module 108 may present a recommendation interface, similar to interface view 600, that may enable friend 212 to review a profile (e.g., a dating profile) of the user (e.g., Daniel Norris) and/or recommend the user associated with affordance 708 as a potential connection (e.g., a potential dating connection) to participant 208.

In some embodiments, friend 212 may approve a participant's request for assistance prior to providing module 108 providing friend 212 with access to the set of information (e.g., dating profile 214, representation 216, participation interface 218, etc.). In such examples, one or more of modules 102 (e.g., receiving module 104, identifying module 106, and/or providing module 108) may present request 210 to friend 212, and may acquire, from friend 212, approval 226. One or more of modules 102 (e.g., receiving module 104, identifying module 106, and/or providing module 108) may then provide friend 212 with access to the set of information (e.g., dating profile 214, representation 216, participation interface 218, etc.) in response to acquiring approval 226 from friend 212.

Approval 226 may include any information that indicates that a friend (e.g., friend 212) of a participant of a discovery service of a social networking system (e.g., participant 208) approves a request for the friend to assist the participant in making connections with other participants of the discovery service.

One or more of modules 102 (e.g., receiving module 104, identifying module 106, and/or providing module 108) may present request 210 to friend 212 in any suitable way. For example, receiving module 104 may send a representation of request 210 to friend 212 via a messaging feature of the social networking system. The representation of the request may include a user input control (e.g., a button, a swipe control, etc.) that may enable friend 212 to indicate approval of request 210. Providing module 108 may then present the representation of request 210 to friend 212 via a user interface of the social networking system presented by user device 202.

One or more of modules 102 (e.g., receiving module 104, identifying module 106, and/or providing module 108) may acquire approval 226 from friend 212 in any suitable way. Continuing with the previous example, having been presented with the representation of request 210, friend 212 may then interact with the user input control in order to indicate his or her approval of request 210. When friend 212 indicates his or her approval of request 210, providing module 108 may cause user device 202 to generate and/or send approval 226 to receiving module 104 via the messaging feature of the social networking system. Receiving module 104 may then acquire approval 226 via the messaging feature of the social networking system. Providing module 108 may then provide friend 212 with access to the portion of the set of information (e.g., dating profile 214, representation 216, participation interface 218, etc.) via recommendation interface 222 in any of the ways described herein in response to receiving module 104 acquiring approval 226.

Figure 8:
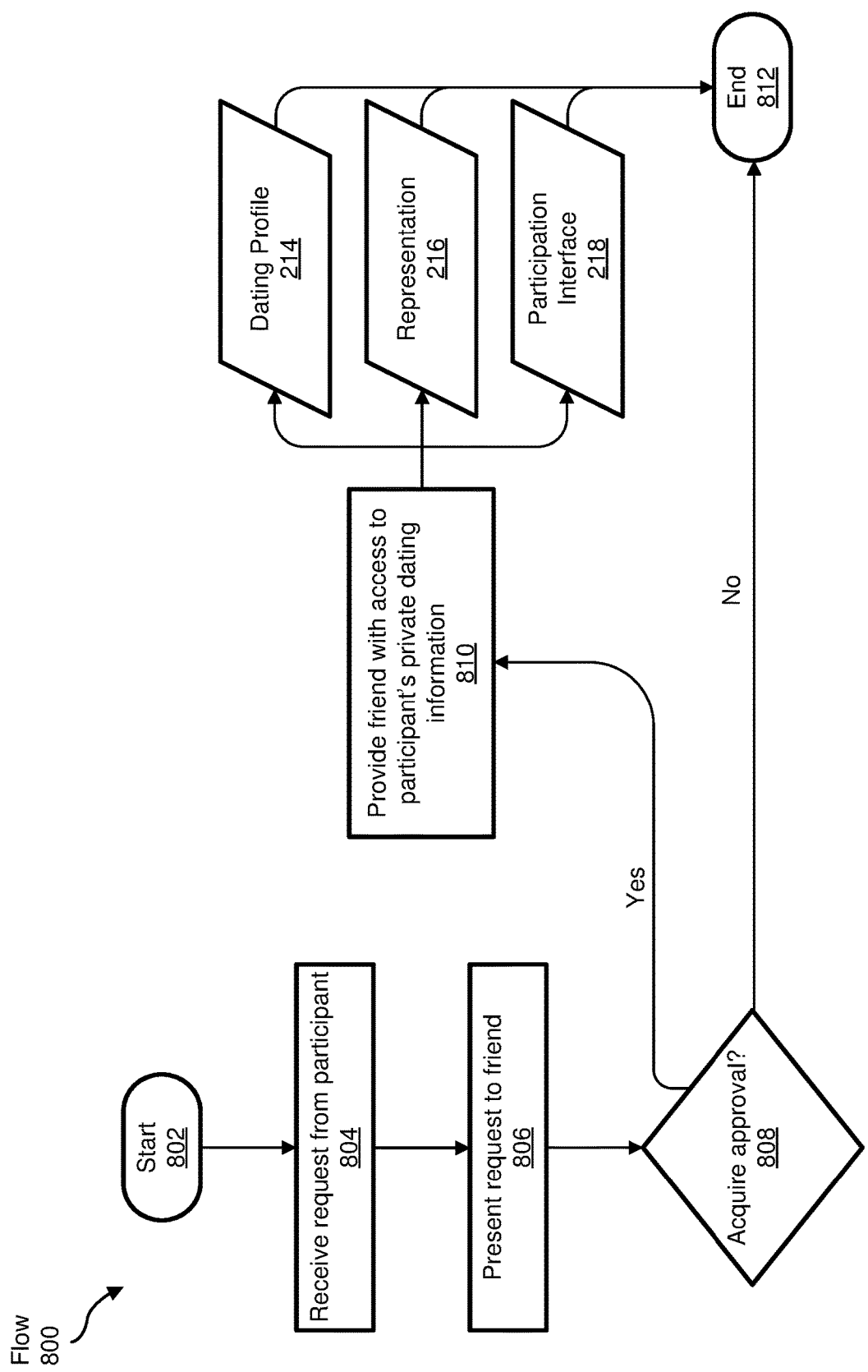
FIG. 8 is a flow diagram that illustrates a process of providing a friend of a participant of a dating service of a social networking system access to private information of the of the participant that is associated with the dating service based on acquiring an approval from the friend of a request for assistance.

FIG. 8 includes a flow diagram 800 ("flow 800") that illustrates how an embodiment of the systems and methods described herein may provide a friend (e.g., friend 212) of a participant of a discovery service of a social networking system (e.g., participant 208) with access to private information of the participant. As shown, flow 800 begins at start 802. At step 804, receiving module 104 may receive a request (e.g., request 210) for a friend (e.g., friend 212) of a participant of a discovery service of a social network (e.g., participant 208) to assist the participant in making connections with other participants of the discovery service. At step 806, one or more of modules 102 (e.g., receiving module 104, identifying module 106, and/or providing module 108) may present the request to the friend. At step 808, one or more of modules 102 (e.g., receiving module 104, identifying module 106, and/or providing module 108) may acquire approval (e.g., approval 226) of the request from the friend.

Upon acquisition of the approval of the request, flow 800 continues at step 810 (e.g., via the "Yes" pathway from step 808), where providing module 108 may provide the friend with access to the participant's private information, such as dating profile 214, representation 216, and/or participation interface 218. After providing module 108 provides the friend with access to the participant's private information, flow 800 may proceed to (e.g., via any of the pathways out of dating profile 214, representation 216, and/or participation interface 218 included in flow 800) and terminates at end 812. If one or more of modules 102 (e.g., receiving module 104, identifying module 106, and/or providing module 108) do not acquire approval of the request (e.g., if friend 212 rejects request 210, if an expiration time period of request 210 elapses before friend 212 approves request 210, etc.), flow 800 proceeds to and terminates at end 812 (e.g., via the "No" pathway from step 808).

In some examples, access by friend 212 to the identified set of information (e.g., dating profile 214, representation 216, participation interface 218, etc.) may be time-limited. Hence, one or more of modules 102 (e.g., receiving module 104, identifying module 106, and/or providing module 108) may prevent friend 212 from viewing the set of information (e.g., dating profile 214, representation 216, and/or participation interface 218) via the recommendation interface after an expiration of a predefined period of time. The predefined period of time may be any suitable period of time, such as five minutes, one hour, one day, one week, and so forth. The period may begin at any suitable time, such as upon receiving module 104 receiving request 210, upon receiving module 104 receiving approval 226, upon receiving module 104 receiving recommendation 228 from friend 212, and so forth.

For example, a suitable period of time may be 24 hours beginning from the time that receiving module 104 receives request 210. In such an example, providing module 108 may provide friend 212 with access to participant data 142 (e.g., dating profile 214, representation 216, and/or participation interface 218) via recommendation interface 222 (e.g., any of interface views 400 through 700) for 24 hours after receiving module 104 receives request 210. Upon the expiration of 24 hours, one or more of modules 102 (e.g., receiving module 104, identifying module 106, and/or providing module 108) may prevent friend 212 from viewing the set of information (e.g., dating profile 214, representation 216, and/or participation interface 218) via the recommendation interface in any suitable way, such as by preventing access to recommendation interface 222, removing one or more elements from recommendation interface 222 (e.g., element 224), preventing friend 212 from logging into the social networking system and/or the discovery service of the social networking system, and so forth.

In some examples, one or more of modules 102 (e.g., receiving module 104, identifying module 106, and/or providing module 108) may prevent the friend (e.g., friend 212) from making more than a predetermined amount of recommendations during a predefined period of time. This may cause friend 212 to carefully consider making particular recommendations, and/or may provide an incentive for friend 212 to make the predetermined amount of recommendations during the predefined period of time. The predetermined amount of recommendations may be any suitable number of recommendations, and the predefined period of time may be any suitable period of time. For example, providing module 108 may prevent friend 212 from making more than 10 recommendations during a 24-hour period of time. Once the friend has made the predetermined amount of recommendations within the predefined amount of time, one or more of modules 102 (e.g., receiving module 104, identifying module 106, and/or providing module 108) may prevent friend 212 from viewing the set of information (e.g., dating profile 214, representation 216, and/or participation interface 218) via the recommendation interface in any suitable way including, but not limited to, any of the ways described herein.

In at least one embodiment, one or more of modules 102 (e.g., receiving module 104, identifying module 106, and/or providing module 108) may also recommend a user of the social networking system to the participant as a potential source of recommendations. For example, one or more of receiving module 104, identifying module 106, and/or providing module 108 may recommend friend 212 to participant 208 as a potential source of recommendations.

One or more of receiving module 104, identifying module 106, and/or providing module 108 may recommend friend 212 to participant 208 as a potential source of recommendations in a variety of contexts. For example, receiving module 104 may receive a direction (e.g., from participant 208, from the discovery service, etc.) to recommend a user of the social networking system to participant 208 as a potential recommendation source. In some examples, the direction may include information representative of an additional participant in the discovery service (e.g., additional participant 220) with whom the friend desires to make a connection (e.g., a dating connection).

In response to receiving the direction, one or more of modules 102 (e.g., receiving module 104, identifying module 106, and/or providing module 108) may access any suitable data source (e.g., database 140) that may include recommender data 144. As mentioned above, recommender data 144 may include any information regarding potential recommendation sources (e.g., potential recommenders) including, but not limited to, information regarding previous experience of users in making recommendations to assist participants of the discovery service in making connections with other participants of the discovery service, relationships of users to participants in the discovery service, whether a user has indicated a desire to assist participants in the discovery service (e.g., participant 208) in making connections within the discovery service, and so forth.

Based on recommender data 144, one or more of modules 102 (e.g., receiving module 104, identifying module 106, and/or providing module 108) may identify a potential recommendation source (e.g., friend 212) for participant 208. For example, recommender data 144 may indicate that friend 212, in addition to being a friend of participant 208, is also a friend of additional user 220. Additionally or alternatively, recommender data 144 may indicate that friend 212 has previously provided recommendations to other participants in the discovery service. As another example, recommender data 144 may indicate that friend 212 is a relative (e.g., a parent, a grandparent, etc.) of participant 208 and has indicated a desire to assist participant 208 in making connections within the discovery service. Hence, based on any of this and/or other data, one or more of modules 102 (e.g., receiving module 104, identifying module 106, and/or providing module 108) may identify friend 212 as a potential source of recommendations.

Upon identifying friend 212 as a potential recommendation source, one or more of modules 102 (e.g., receiving module 104, identifying module 106, and/or providing module 108) may send a message indicating friend 212 as a potential recommendation source to participant 208. For example, identifying module 106 may send a message indicating friend 212 as a potential recommendation source to participant 208 via a messaging feature of the social networking system.

In some examples, a participant in a discovery service (e.g., participant 208) may wish to have more than one friend at a time assist them in making connections with other participants of the discovery service. In such examples, one or more of modules 102 (e.g., receiving module 104) may receive, from the participant in the discovery service (e.g., participant 208) an additional request for at least one additional friend of the participant to assist the participant in making connections with other participants of the discovery service. For example, receiving module 104 may receive, from participant 208, an additional request for at least one additional friend of participant 208 to assist participant 208 in making connections with other participants of the discovery service.

Receiving module 104 may receive, from participant 208, an additional request for an additional friend to assist participant 208 in making connections with other participants of the discovery service in any suitable way. For example, participant 208 may submit a request for assistance from an additional friend via a user interface of the discovery service of the social networking system. Receiving module 104 may then receive the additional request via a messaging feature of the social networking system. As another example, participant 208 may contact and request assistance from the additional friend outside of the social networking system, and may provide the additional friend with access information (e.g., an access code, a password, a permission code, etc.) that indicates that participant 208 desires assistance from friend 212. If the additional friend decides to assist participant 208, the additional friend may enter the access information into a suitable interface of the dating service of the social networking system. This may then cause receiving module 104 to receive the additional request from participant 208 via the discovery service.

Having received the additional request, and while providing friend 212 with access to the set of information via recommendation interface 222, one or more of modules 102 (e.g., receiving module 104, identifying module 106, and/or providing module 108) may provide the additional friend of participant 208 with access to the set of information (e.g., any of the information included in participant data 142) via an additional recommendation interface that enables the participant to make recommendations to the participant regarding the set of information. In some examples, providing module 108 may provide the additional friend with access to the set of information via an additional recommendation interface that may be in any way analogous to any of the ways described herein in relation to providing friend 212 with access to the set of information via recommendation interface 222. For example, providing module 108 may provide the additional friend with access to the set of information via an additional recommendation interface included in a computing device associated with the additional friend. In some examples, both friend 212 and the additional friend may simultaneously use the same computing device (e.g., user device 202) to provide recommendations regarding the same portion of the set of information. Additionally or alternatively, each friend may provide recommendations regarding the set of information independently of each other, each using his or her own computing device (e.g., each friend may provide different recommendations regarding different portions of the set of information via different computing devices).

In this and other ways, the systems and methods described herein may enable a participant in a discovery service (e.g., participant 208) to receive recommendations regarding private information (e.g., private dating information) from more than one friend at one time. In some examples, the number of friends from which participant 208 may be limited to any suitable predetermined number of friends, such as three friends, at a time.

As discussed throughout the instant disclosure, the disclosed systems and methods may provide one or more advantages over traditional methods of discovering other users of a social networking system. For example, by providing a friend of a participant in the discovery service with access to a set of private information of the participant, the systems and methods described herein may enable the participant to acquire useful assistance from the friend in making connections within the social networking system.

For example, by providing access to a dating profile of the participant via a recommendation interface that enables the friend to make recommendations to the participant regarding the dating profile, the systems and methods described herein may enable the friend to recommend changes or revisions to the dating profile. These recommendations may enable the friend and/or the participant to improve the chances of the participant making desired, high-quality, lasting dating connections within a dating service of the social networking system.

As another example, by providing the friend with access to various representations of other participants in the dating service, along with a "matching surface" interface that enables the friend to recommend other participants to the participant as possible dating connections, the systems and methods described herein may enable the friend to recommend potential dating connections to the participant. Additionally, by providing the friend with access to a "dating lens" interface of the social networking system that visually indicates, when representing users of the social networking system within the social networking system (e.g., within content feeds, group lists, search results, etc.), whether the users are also participating in the dating service of the social network, the systems and methods described herein may enable the friend to serendipitously discover other participants in the dating service whom the friend may recommend as potential dating connections to the participant. With such assistance from the friend, the participant may be more likely to make desired, high-quality, lasting dating connections within the dating service of the social networking system.

Additionally, the systems and methods described herein may enable a participant to request and/or receive dating assistance from any friend of the participant within the social networking system including, without limitation, family members, relatives, real-world friends, community members, and acquaintances. Therefore, the systems and methods described herein may support and/or facilitate cultural courtship practices that may value family and/or community involvement in the courtship process.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a request for assistance from a participant of a discovery service of a social network to be transformed, transform the request for assistance, output a result of the transformation to identify a set of information that is associated with the discovery service and that is designated as private to the participant, use the result of the transformation to provide a friend of the participant with access to the set of information, and store the result of the transformation to enable the friend to provide recommendations regarding the set of information to the participant. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
  receiving, from a participant in a discovery service provided by a social networking system, the social networking system comprising a computing platform that manages social connections between users of the computing platform, a request for a friend of the participant to assist the participant in making connections with other participants of the discovery service, the friend of the participant comprising a user of the social networking system with whom the participant maintains a social connection via the social networking system;
  identifying at least one set of information that is associated with the discovery service and that is designated as private to the participant;
  providing the friend of the participant with access to at least a portion of the set of information via a recommendation interface that enables the friend of the participant to make recommendations to the participant regarding the portion of the set of information to assist the participant in making connections with other participants of the discovery service; and
  while providing the friend of the participant with access to the portion of the set of information and when visually representing a social media post made by an additional user of the social networking system to the friend within a newsfeed interface of the social networking system,
    including a discovery service interface affordance in a visual representation of the social media post made by the additional user when the additional user is participating in the discovery service such that the social media post is visually distinct from an additional social media post and made by a further user of the social networking system who is not participating in the discovery service.

2. The computer-implemented method of claim 1, further comprising receiving a recommendation regarding the set of information from the friend via the recommendation interface.

3. The computer-implemented method of claim 1, wherein the discovery service of the social networking system comprises a dating service of the social networking system.

4. The computer-implemented method of claim 3, wherein the set of information comprises at least one of:
  a dating profile of the participant; or
  a representation of at least one additional participant in the dating service of the social networking system.

5. The computer-implemented method of claim 3, wherein:
  the set of information comprises a dating profile of the participant; and
  the recommendation interface comprises at least one interface element that enables the friend of the participant to recommend at least one change to the dating profile to the participant.

6. The computer-implemented method of claim 5, wherein the interface element comprises an editing interface that enables the friend to edit the dating profile of the participant.

7. The computer-implemented method of claim 3, wherein:
  the set of information comprises a representation of at least one additional participant in the dating service of the social networking system;
  providing the friend with access to at least a portion of the set of information via the recommendation interface comprises presenting the representation of the additional participant to the friend via the recommendation interface; and
  the recommendation interface comprises an interface element that enables the friend to recommend the additional participant to the participant as a potential connection.

8. The computer-implemented method of claim 3, wherein the recommendation interface comprises an interface element that enables the friend to recommend the additional user to the participant as a potential connection when the interface of the social networking system visually indicates that the additional user is also participating in the dating service of the social networking system.

9. The computer-implemented method of claim 1, wherein:
  the computer-implemented method further comprises:
    presenting the request for the friend of the participant to assist the participant in making connections with other participants of the discovery service to the friend of the participant; and
    acquiring, from the friend of the participant, an approval of the request; and
  providing the friend with access to the portion of the set of information via the recommendation interface comprises providing the friend with access to the portion of the set of information via the recommendation interface in response to acquiring the approval of the request.

10. The computer-implemented method of claim 1, wherein identifying the set of information comprises excluding, from the set of information, information regarding users of the social networking system who are at least one of:
  friends of the participant; or
  friends of the friend.

11. The computer-implemented method of claim 1, further comprising preventing the friend from making more than a predetermined amount of recommendations during a predefined period of time.

12. The computer-implemented method of claim 1, wherein the friend is a relative of the participant.

13. The computer-implemented method of claim 1, further comprising recommending at least one user of the social networking system to the participant as a potential source of recommendations.

14. The computer-implemented method of claim 13, wherein recommending the at least one user of the social networking system to the participant is based on at least one of:
  previous experience of the user in making recommendations to assist participants of the discovery service in making connections with other participants of the discovery service; or
  a relationship of the user to the participant.

15. The computer-implemented method of claim 1, further comprising:
  receiving, from the participant in the discovery service of the social networking system, an additional request for at least one additional friend of the participant to assist the participant in making connections with other participants of the discovery service; and
  while providing the friend of the participant with access to the set of information via the recommendation interface, providing the additional friend of the participant with access to the set of information via an additional recommendation interface that enables the additional friend of the participant to make recommendations to the participant regarding the set of information.

16. The computer-implemented method of claim 1, wherein preventing the friend from viewing the set of information via the recommendation interface after the expiration of the predefined period of time comprises at least one of:
  preventing the friend from accessing the recommendation interface;
  removing one or more elements from the recommendation interface; or
  preventing the friend from logging into the discovery service of the social networking system.

17. A system comprising:
  a receiving module, stored in memory, that receives, from a participant in a discovery service provided by a social networking system, the social networking system comprising a computing platform that manages social connections between users of the computing platform, a request for a friend of the participant to assist the participant in making connections with other participants of the discovery service, the friend of the participant comprising a user of the social networking system with whom the participant maintains a social connection via the social networking system;
  an identifying module, stored in memory, that identifies at least one set of information that is associated with the discovery service and that is designated as private to the participant;
  a providing module, stored in memory, that:
    provides the friend of the participant with access to at least a portion of the set of information via a recommendation interface that enables the friend of the participant to make recommendations to the participant regarding the set of information to assist the participant in making connections with other participants of the discovery service; and
    while providing the friend of the participant with access to the portion of the set of information and when visually representing a social media post made by an additional user of the social networking system to the friend within a newsfeed interface of the social networking system,
      includes a discovery service interface affordance in a representation of a social media post made by the additional user when the additional user is participating in the discovery service such that the social media post is visually distinct from an additional social media post made by a further user of the social networking system who is not participating in the discovery service; and
  at least one physical processor that executes the receiving module, the identifying module, and the providing module.

18. The system of claim 17, wherein the receiving module further receives a recommendation regarding the set of information from the friend via the recommendation interface.

19. The system of claim 17, wherein the identifying module identifies the set of information by excluding, from the set of information, information regarding users of the social networking system who are at least one of:
  friends of the participant; or
  friends of the friend.

20. A non-transitory computer-readable medium comprising:
  computer-readable instructions that, when executed by at least one processor of a computing system, cause the computing system to:
    receive, from a participant in a discovery service provided by a social networking system, the social networking system comprising a computing platform that manages social connections between users of the computing platform, a request for a friend of the participant to assist the participant in making connections with other participants of the discovery service, the friend of the participant comprising a user of the social networking system with whom the participant maintains a social connection via the social networking system;
    identify at least one set of information that is associated with the discovery service and that is designated as private to the participant;
    provide the friend of the participant with access to at least a portion of the set of information via a recommendation interface that enables the friend of the participant to make recommendations to the participant regarding the set of information to assist the participant in making connections with other participants of the discovery service; and
    while providing the friend of the participant with access to the portion of the set of information and when visually representing a social media post made by an additional user of the social networking system to the friend within a newsfeed interface of the social networking system,
      include a discovery service interface affordance in a visual representation of a social media post made by the additional user when the additional user is participating in the discovery service such that the social media post is visually distinct from an additional social media post and made by a further user of the social networking system who is not participating in the discovery service.

* * * * *